(12) United States Patent
Lambert et al.

(10) Patent No.: US 6,828,560 B2
(45) Date of Patent: Dec. 7, 2004

(54) INTEGRATED LIGHT CONCENTRATOR

(75) Inventors: David K. Lambert, Sterling Heights, MI (US); Han-Sheng Lee, Bloomfield Hills, MI (US); Dan W. Chilcott, Greentown, IN (US); Hamid R. Borzabadi, Noblesville, IN (US); Qin Jiang, Kokomo, IN (US); James H. Logsdon, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 23 days.

(21) Appl. No.: 10/059,401

(22) Filed: Jan. 31, 2002

(65) Prior Publication Data

US 2003/0141455 A1 Jul. 31, 2003

(51) Int. Cl.[7] .................................................. G01J 5/08
(52) U.S. Cl. ....................................................... 250/353
(58) Field of Search .............................. 250/353, 338.1

(56) References Cited

U.S. PATENT DOCUMENTS

| | | | | |
|---|---|---|---|---|
| 4,754,139 A | * | 6/1988 | Ennulat et al. ............. 250/332 |
| 5,518,176 A | | 5/1996 | Turner et al. ............... 340/542 |
| 5,693,942 A | * | 12/1997 | Endo et al. ............... 250/338.1 |
| 5,721,430 A | * | 2/1998 | Wong ...................... 250/339.13 |
| 5,910,659 A | * | 6/1999 | Johnson et al. ........... 250/495.1 |
| 5,962,854 A | * | 10/1999 | Endo ........................... 250/349 |
| 6,107,925 A | * | 8/2000 | Wong ........................... 340/628 |
| 6,203,194 B1 | * | 3/2001 | Beerwerth et al. .......... 374/133 |
| 6,218,667 B1 | * | 4/2001 | Nonaka et al. .............. 250/353 |
| 6,335,478 B1 | * | 1/2002 | Chou et al. .................. 136/201 |
| 6,342,667 B1 | * | 1/2002 | Shen et al. ................... 136/201 |
| 6,670,538 B2 | * | 12/2003 | Wilner et al. ............... 136/230 |
| 2002/0060291 A1 | * | 5/2002 | Morita et al. ............. 250/338.1 |

OTHER PUBLICATIONS

"Bolometers for Infrared and Millimeter Waves," P. L. Richards, Jul. 1, 1994, pp. 1–23, 1994 American Institute of Physics.

"Infrared Smart Sensors for Climate Control, Person Detection and Air Quality," K. Jorg Schieferdecker et al., pp. 351–357.

"Low Temperature Packaging of CMOS Infrared Microsystems by Si–Al–Au Bonding," M. Waelti et al., pp. 147–154, Electrochemical Society Proceedings, vol. 97–36.

* cited by examiner

Primary Examiner—G. Bradley Bennett
Assistant Examiner—R. Alexander Smith
(74) Attorney, Agent, or Firm—Stefan V. Chmielewski (57) ABSTRACT

An infrared sensor including an absorber for absorbing incident infrared power to produce a signal representing the temperature of a target object, a frame supporting a membrane which carries the absorber, the frame including a plurality of reflecting surfaces disposed about the circumference of an opening over which the membrane spans for reflecting incident infrared power toward the absorber. By concentrating incident infrared power through reflection, the temperature difference between the absorber and the surrounding frame is increased, thereby producing an increased electrical output from the sensor.

46 Claims, 10 Drawing Sheets

INTEGRATED LIGHT CONCENTRATOR

TECHNICAL FIELD

The present invention relates generally to infrared detectors and, more specifically, to a thermopile infrared detector having an integrated light concentrator to increase the amount of infrared power sensed by the detector.

BACKGROUND OF THE INVENTION

Non-contact temperature measurement may be accomplished using a conventional infrared detector. Such infrared detectors are suitable for a variety of applications, including HVAC control systems for automotive applications. In this application, infrared detectors are directed toward the driver and passenger in the vehicle. The detectors sense the infrared power emitted from the occupants' skin, clothing, and surrounding portions of the vehicle interior, and convert that power to heat. Thermocouples in the detector convert the heat flux to a corresponding sensor output voltage which represents the temperature of the object.

More specifically, conventional thermopile detectors include a silicon frame which defines an opening. A thermally isolating membrane spans the opening. An absorber region is created on the membrane and is centered in the opening. The portion of the membrane between the outer dimensions of the absorber region and the inner dimensions of the opening thermally isolates the absorber region from the frame.

A plurality of thermocouples are connected in series and extend across this thermally isolating portion of the membrane between the frame and the absorber. As incident infrared light reaches the absorber, the infrared power is absorbed, and the temperature of the absorber changes. This temperature change results in a change in the Seebeck voltage from the thermocouples, between the ends of the thermocouples connected to the frame and the ends of the thermocouples connected to the absorber. Since the thermocouples are connected in series, the voltage change across each thermocouple is added to the voltage of the remaining thermocouples.

Unfortunately, sensed changes in temperature result in relatively small changes in output voltage of such sensors. Accordingly, it is desirable to increase the output voltage to improve the resolution of the device. One way to increase the output voltage change due to a temperature change of a target object is by increasing the amount of infrared radiation received by the sensor by using a lens such as a refractive lens or a fresnel lens. Refractive lenses made of infrared transmitting materials, however, are typically expensive and must be carefully positioned. Fresnel lenses, which use diffraction, require a relatively large distance between the lens and the absorber, resulting in a larger sensor package. Alternatively, curved surfaces of revolution, or a Winston light concentrator in which a section of a parabola is revolved to form the reflecting surface, could be incorporated into the device. However, the manufacturing process for micromachined devices such as thermopile infrared detectors makes the incorporation of such shapes for each detector commercially undesirable.

SUMMARY OF THE INVENTION

The present invention provides an infrared sensor including an absorber for absorbing incident infrared power to produce a signal representing the temperature of a target object and a frame supporting the absorber which includes a plurality of reflecting surfaces disposed about the circumference of the absorber for reflecting incident infrared power toward the absorber to increase the output voltage resulting from a given change in temperature of the target object. In one embodiment of the invention, the reflection surfaces are formed on the etched sidewalls of the cavity which are created behind a membrane including the absorber. The cavity is formed during the standard fabrication process of the thermopile. As infrared power reaches the sensor, incident infrared power is reflected off of the reflecting surfaces toward the absorber, thereby increasing the difference in temperature between the absorber and the frame. The reflecting surfaces may be covered with a metal film to further increase the absorbed power of the sensor.

According to another embodiment of the invention, a separate rectangular frame structure is produced by micromachining silicon to form a light concentrator that may be attached to the front side of a thermopile sensor using appropriate adhesive material. The light concentrator includes reflecting surfaces which also reflect incident infrared power to the absorber. In this embodiment, metal may be deposited on the entire frame during a fabrication step already used to manufacture the thermopile detector.

These and other features of the present invention will become more apparent and the invention will be better understood upon consideration of the following description and the accompanying drawings.

DESCRIPTION OF THE EMBODIMENTS OF THE INVENTION

The embodiments of the invention described herein are not intended to be exhaustive or to limit the invention to the precise forms disclosed. Rather, the embodiments selected for description have been chosen to enable one skilled in the art to practice the invention.

Figure 1:
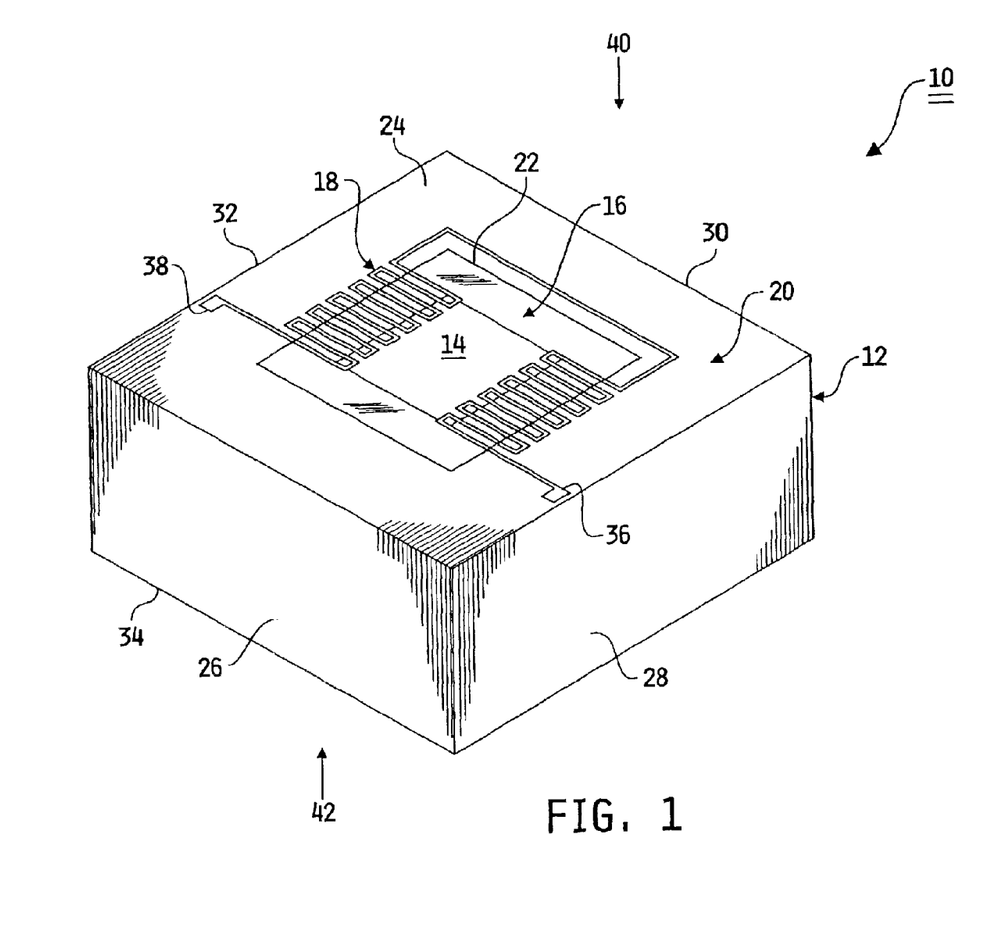
FIG. 1 is a perspective view of a thermopile infrared detector according to the present invention.

FIG. 1 shows an infrared sensor or thermopile infrared detector formed using a standard micromachining fabrication process from silicon wafers as will be further described below. Sensor 10 generally includes a frame 12, an absorber 14, a membrane 16, and a plurality of thermocouples 18. Frame 12, formed from silicon, includes a body 20 and an opening 22. Body 20 includes a end surface 24, outer side surfaces 26, 28, 30, 32, and an opposed end surface 34.

Membrane 16 is supported by frame 12 according to principles well known in the art, and spans opening 22. Absorber 14 is prepared in the central region of membrane 16 in a conventional manner. The plurality of thermocouples 18, which together constitute the thermopile, are also prepared on membrane 16 and extend between absorber 14 and frame 12. As is commonly known in the art, thermocouples 18 are connected in series such that the Seebeck voltage of each thermocouple 18 is added to the Seebeck voltage of the remaining thermocouples to result in an overall induced voltage due to the change in temperature between absorber 14 and frame 12. The output signal (a voltage measured across the total resistance of thermocouples 18) is measured at pads 36, 38. Pad 36 is connected to one end of the plurality of series connected thermocouples 18, and pad 38 is connected to the other end of the plurality of series connected thermocouples 18. When employed in a conventional application, side 40 of sensor 10 is directed toward the target object to receive incident infrared power. Side 42 is directed away from the target object.

Figure 2:
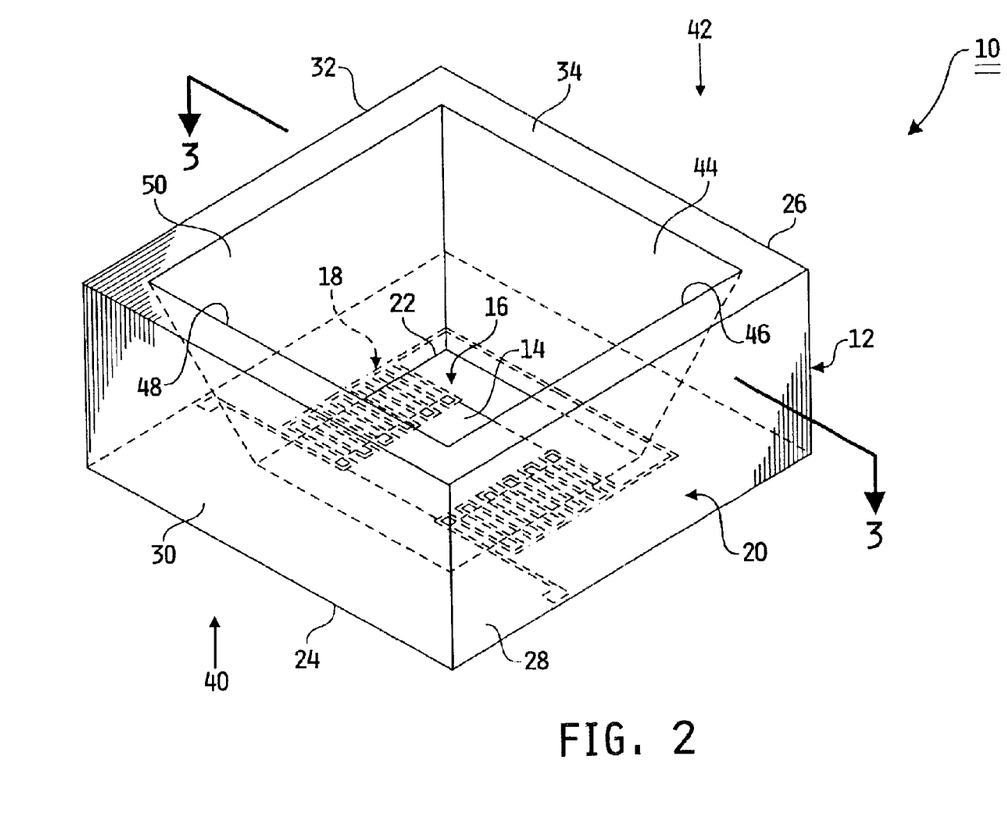
FIG. 2 is another perspective view of the infrared sensor of FIG. 1.

Referring now to FIG. 2, body 20 of frame 12 also includes reflecting surfaces 44, 46, 48, and 50. Each of reflecting surfaces 44, 46, 48, 50 extend between end surface 34 and opening 22. Reflecting surfaces 44, 46, 48, 50 are formed during the fabrication process when the silicon behind membrane 16 is etched away. As a result of this process, each of reflecting surfaces 44, 46, 48, 50 form an obtuse angle relative to membrane 16. Together with membrane 16, reflecting surfaces 44, 46, 48, 50 form a cavity for concentrating incident infrared power as further described below.

Figure 3:
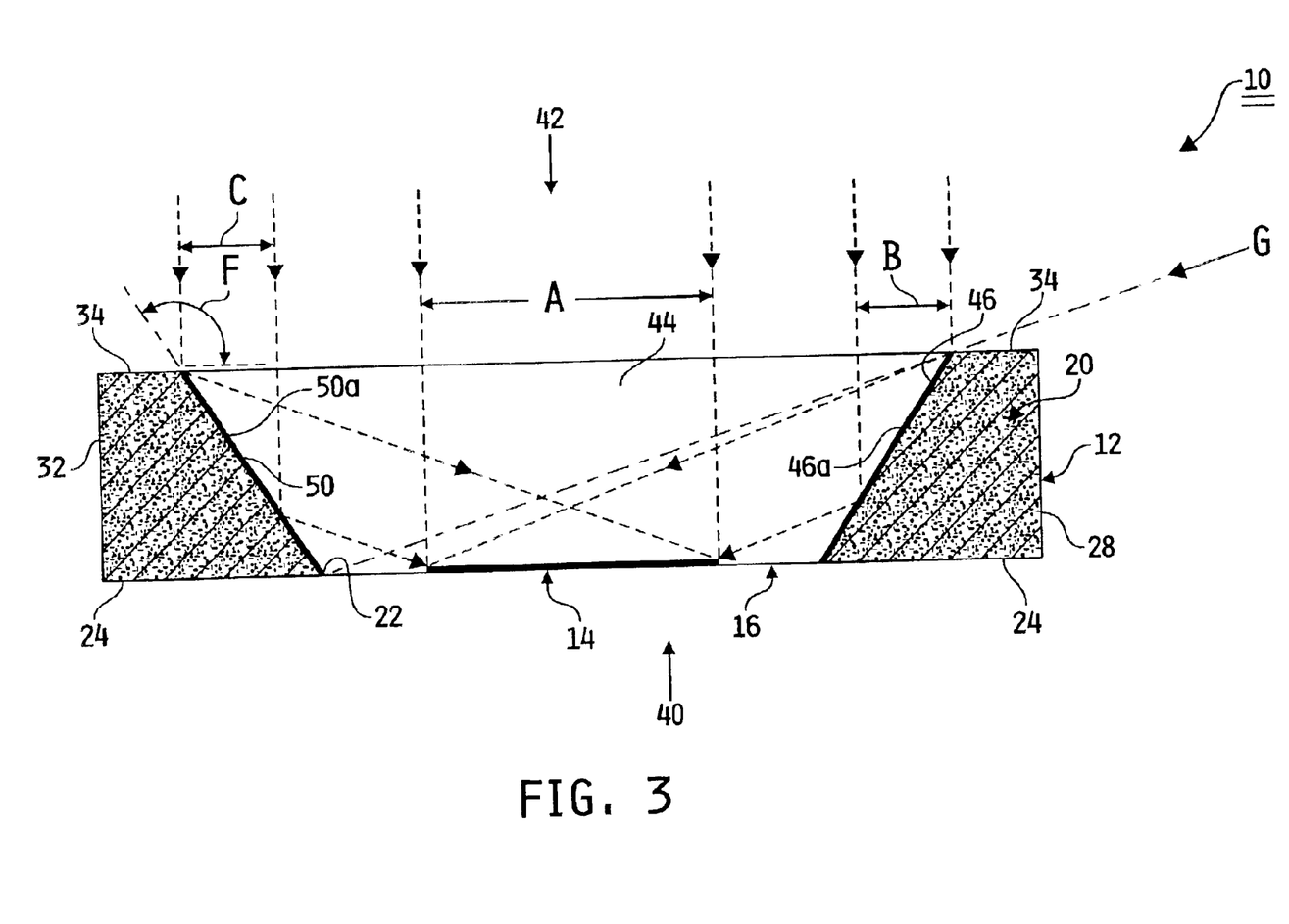
FIG. 3 is a cross-sectional view of the thermopile of FIG. 2 taken substantially along line 3—3.
Figure 4:
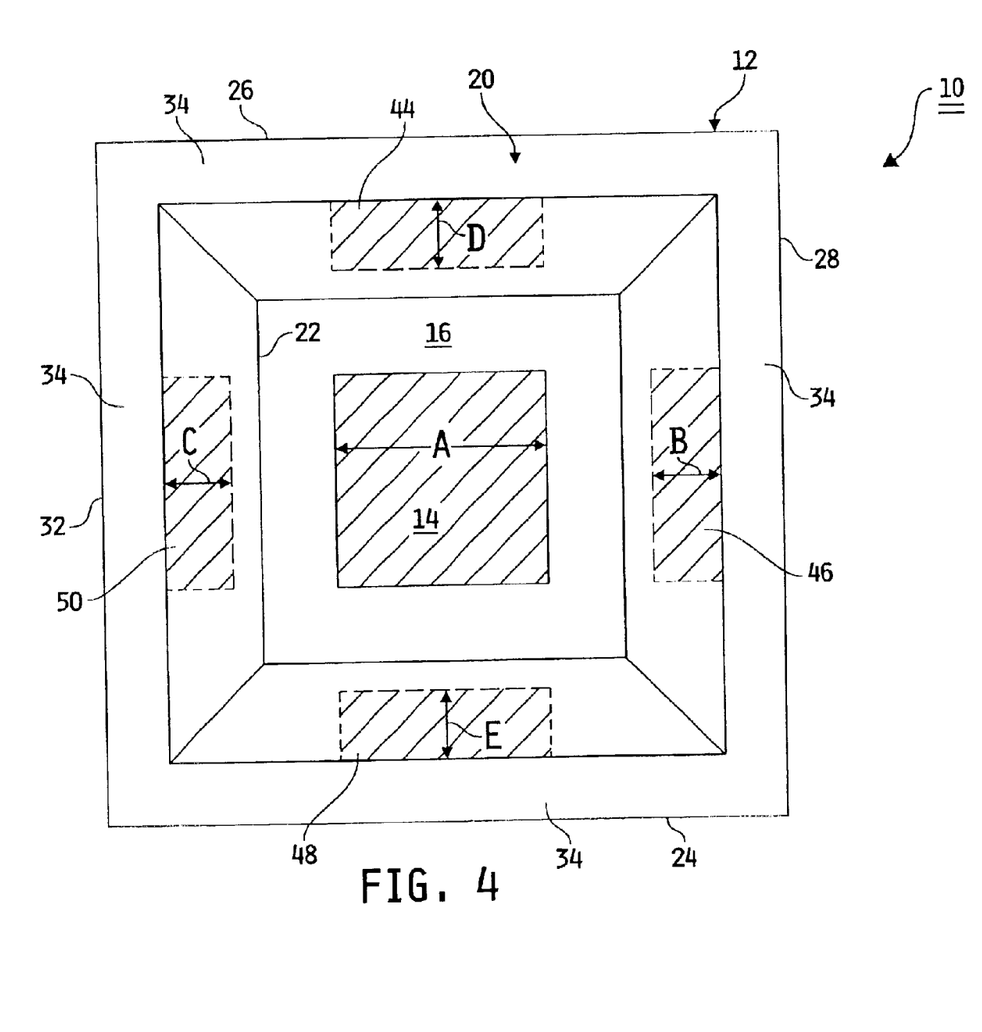
FIG. 4 is a top plan view of the sensor of FIGS. 1 and 2.

Referring now to FIG. 3, a cross-sectional view of infrared sensor 10 is shown to illustrate the light concentrator resulting from reflecting surfaces 44, 46, 48, 50. As shown, end 42 of sensor 10 is directed toward the target object (not shown) to receive incident infrared power. As should be apparent from the drawing, if incident infrared power were received from end 40 of sensor 10, and assuming that end surface 24 of sensor 10 were positioned perpendicular to the direction of the incident infrared power from the target object (not shown), only the incident infrared power reaching sensor 10 within the outline of absorber 14 (indicated by dimension A) would be converted to heat by absorber 14, ultimately resulting in an output voltage from sensor 10. When end surface 34 of side 42 is directed toward the target object (not shown), incident infrared power is also received within dimension A and absorbed by absorber 14. In addition, however, power is reflected toward absorber 14 by reflecting surface 46 within region B. Similarly, incident power which reaches reflecting surface 50 (dimension C), and reflecting surfaces 44 and 48, not shown in FIG. 3, is also reflected toward and absorbed by absorber 14. FIG. 4 best shows these similar regions having dimensions D and E corresponding to reflecting surfaces 44, 48, respectively. Accordingly, the shaded portions of reflecting surfaces 44, 46, 48, 50 having dimensions D, B, E, and C, respectively, represent area, in additional to the area of absorber 14, which may collect and reflect incident power toward absorber 14.

Referring again to FIG. 3, the angle of reflecting surfaces 44, 46, 48, 50 relative to absorber 14 may be a variety of obtuse angles indicated by angle F. In one embodiment of the invention, angle F is 125.26 degrees. With uncoated, etched reflecting surfaces 44, 46, 48, 50 at this angle, it has been determined that the infrared power absorbed by absorber 14 is increased by a factor of about 1.4 relative to the infrared power absorbed by directing end 40 of sensor 10 toward the target object. Surfaces 44, 46, 48, 50 may also be coated with metal 44A, 46A, 48A, 50A, respectively, (only 46A and 50A shown) to increase the reflectivity of reflecting surfaces 44, 46, 48, 50. By coating reflecting surfaces 44, 46, 48, 50 with metal (such as aluminum), the power absorbed by absorber 14 may be increased by a factor of approximately 2.3.

Reflecting surfaces 44, 46, 48, 50 may be coated using a variety of conventional techniques. For example, metal may be evaporated or sputtered in a vacuum at an angle such that one portion of body 20 masks or shadows membrane 16 and absorber 14, but permits coating of one of the reflecting surfaces. For example, if metal is directed toward body 20 along the direction indicated by arrow G in FIG. 3, metal will not be deposited on membrane 16 or absorber 14, but will reach reflecting surface 50 to become metal coating 50A. As should be apparent from the foregoing, four such processing steps are required to coat all reflecting surfaces 44, 46, 48, 50. Alternatively, a conventional process of electroless plating may be used to deposit metal on the silicon of reflecting surfaces 44, 46, 48, 50, but not on membrane 16 or absorber 14 (typically made of silicon nitride and silicon oxynitride). Additionally, the entire interior surface of the cavity formed by reflecting surfaces 44, 46, 48, 50 and membrane 16 may be coated with metal such as by sputter deposition, which metal may be selectively removed using either electrodeposited photoresist or spray-on photoresist.

Figure 5:
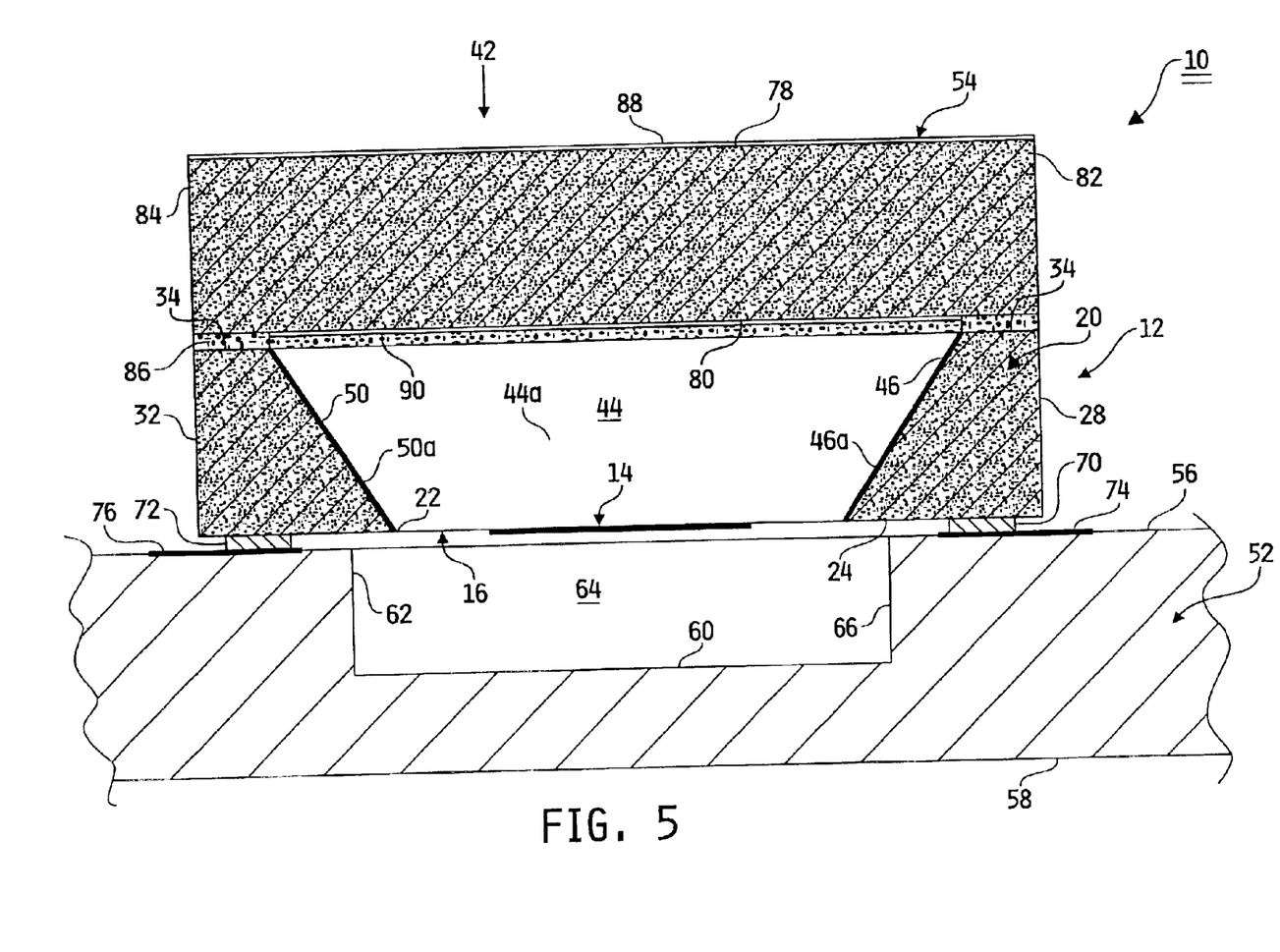
FIG. 5 is a cross-sectional view showing one implementation of the thermopile of FIGS. 1–4.

FIG. 5 shows sensor 10 as a fully packaged device, wherein frame 12 is mounted to a circuit board 52 and includes a silicon window 54. Specifically, circuit board 52 includes an upper side 56, a lower side 58, and a rectangular void having a bottom surface 60 and four sidewalls 62, 64, 66, 68 (68 not shown). The void formed in circuit board 52 is slightly larger than the area of opening 22 in frame body 20. This open space behind absorber 14 provides a thermally insulating area. Thermocouples 18 are connected from pads 36, 38 (FIG. 1) through solder bumps 70, 72 to conductive traces 74, 76, respectively, on circuit board 52.

Silicon window 54 roughly corresponds to the size or footprint of body 20 of frame 12. Window 54 includes an upper surface 78, a lower surface 80, side surfaces 82, 84, and two other side surfaces (not shown) which are aligned with side surfaces 26, 30 of frame 12. Window 54 is attached to end surface 34 of frame 12 with glass frit 86 or some other conventional attachment structure. By enclosing the cavity formed by reflecting surfaces 44, 46, 48, 50 and membrane 16, window 54 isolates absorber 14 from convective air currents which may influence the temperature change of absorber 14.

Window 54 further includes an anti-reflection coating 88 applied to upper surface 78 and an interference filter coating 90 applied to lower surface 80. As is commonly known in the art, since silicon has a high index of refraction, an anti-reflection coating is desirable to permit better infrared transmission through window 54 and to prevent incident infrared power from being reflected off of surface 78. Interference filter coating 90 is designed to reduce the short wavelength end of the spectrum of light entering sensor 10. As is known in the art, these visible light components may affect the infrared measurement of absorber 14.

In operation, infrared power is transmitted through silicon window 54 into the cavity formed by a reflecting surfaces 44, 46, 48, 50. Some of the power passes directly to absorber 14 to result in a temperature change between absorber 14 and body 20 of frame 12. Additional power is reflected off of metal coatings 44A, 46A, 48A, and 50A of reflecting surfaces 44, 46, 48, 50, respectively, and directed toward absorber 14 as best shown in FIG. 3. This additional infrared power increases the temperature change between absorber 14 and body 20.

Figure 6:
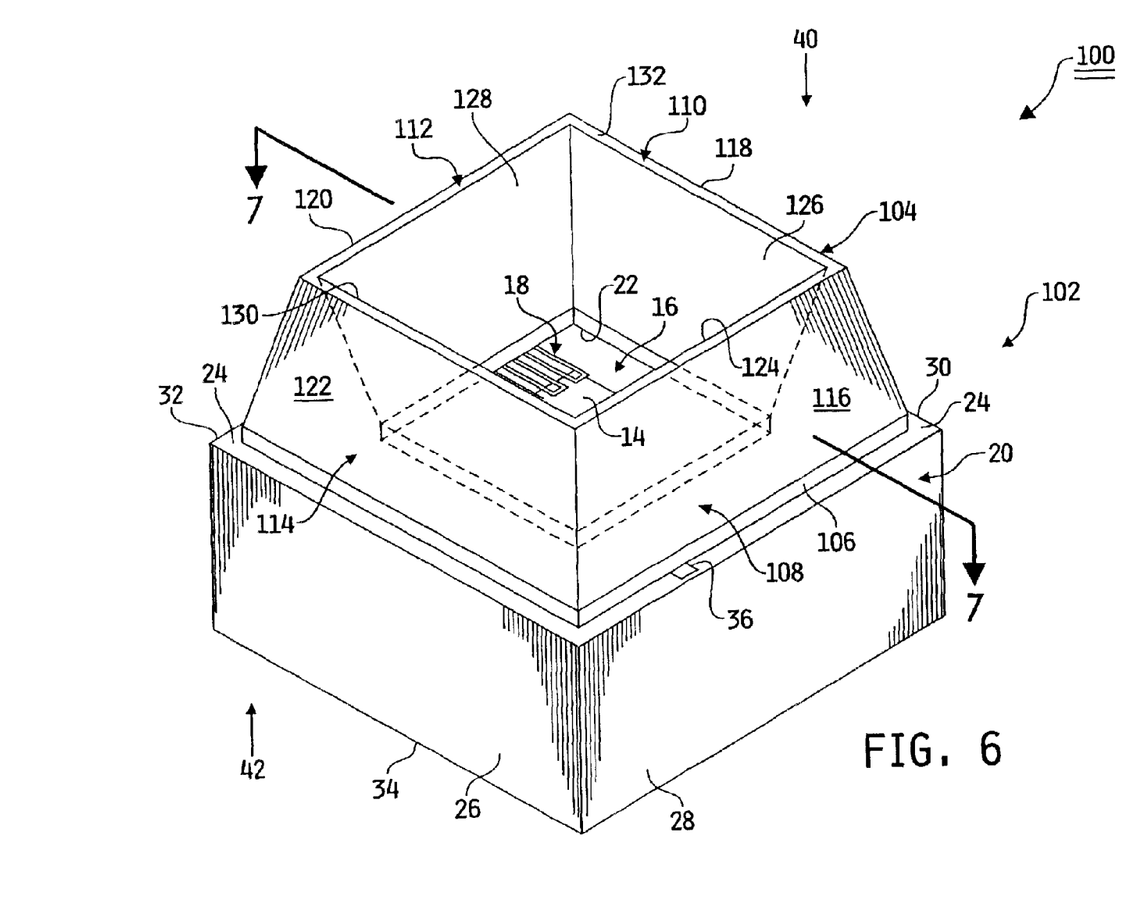
FIG. 6 is a perspective view of another embodiment of a sensor according to the present invention.
Figure 7:
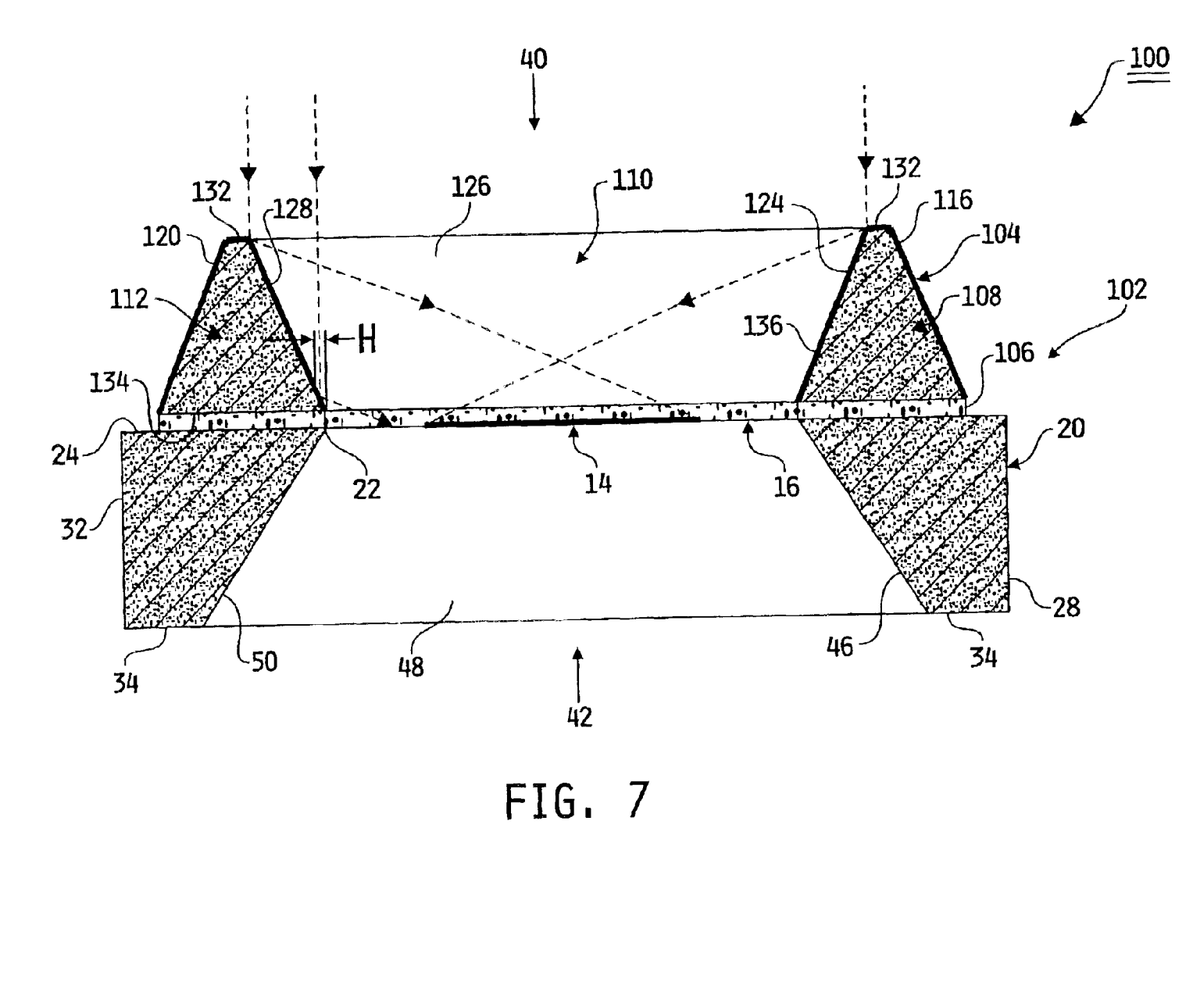
FIG. 7 is a cross-sectional view of the embodiment of FIG. 6 taken substantially along line 7—7.

Referring now to FIG. 6, another embodiment of an infrared sensor according to the present invention is shown. Infrared sensor 100 generally includes an absorber 14, a membrane 16, a plurality of thermocouples 18 similar to those described above in conjunction with FIGS. 1–5, and a frame 102. Frame 102 includes a body 20 which is identical to the body described in conjunction with FIGS. 1–5 except that surfaces 44, 46, 48, and 50 do not, in the embodiment of FIG. 6, function as reflecting surfaces. Accordingly, none of those surfaces includes a metallic coating. Instead, body 20 is oriented in a conventional manner with side 40 directed toward the target object. Frame 102 further includes a light concentrator 104 which is attached to surface 24 of body 20 using adhesive material 106 (FIG. 7).

Light concentrator 104 is a separate, micromachined silicon component which is etched using the same technology and processing steps used to form the cavity below membrane 16 of thermopile 100. It should be understood that entire wafers of light concentrators 104 and entire wafers of bodies 20 are produced prior to assembly as sensors 100. A wafer of light concentrators 104 is joined to a wafer of bodies 20, and sensors 100 are individually sawed from the joined wafers. Light concentrator 104 has four main portions or sections, including a first segment 108, a second segment 110, a third segment 112, and a fourth segment 114. Segments 108, 110, 112, 114 include outer surfaces 116, 118, 120, 122, inner surfaces 124, 126, 128, 130, respectively, a shared upper surface 132, and a lower surface 134. As best shown in FIG. 7, a layer of metal is deposited onto concentrator 104 to cover all of surfaces 116, 118, 120, 122, 124, 126, 128, 130, 132 of segments 108, 100, 112, 114 using a standard evaporation or sputtering technique as described above. Since concentrator 104 is a separate component, this metal coating 136 may be applied to concentrator 104 without the need for masking absorber 14 or otherwise incorporating special processing steps. Moreover, an entire wafer of concentrators 104 may be processed simultaneously.

During assembly, light concentrator 104 is positioned over opening 22 and attached to body 20 using adhesive material 106. Once attached, as shown in FIG. 6, contact pads 36, 38 of the plurality of thermocouples 18 are exposed so that a wire bonder has access to the pads to make the electrical connections to leads (not shown) that pass out of a ceramic package (not shown) enclosing infrared sensor 100. Such a package could also include a silicon window as described with reference to FIG. 5.

Figure 8:
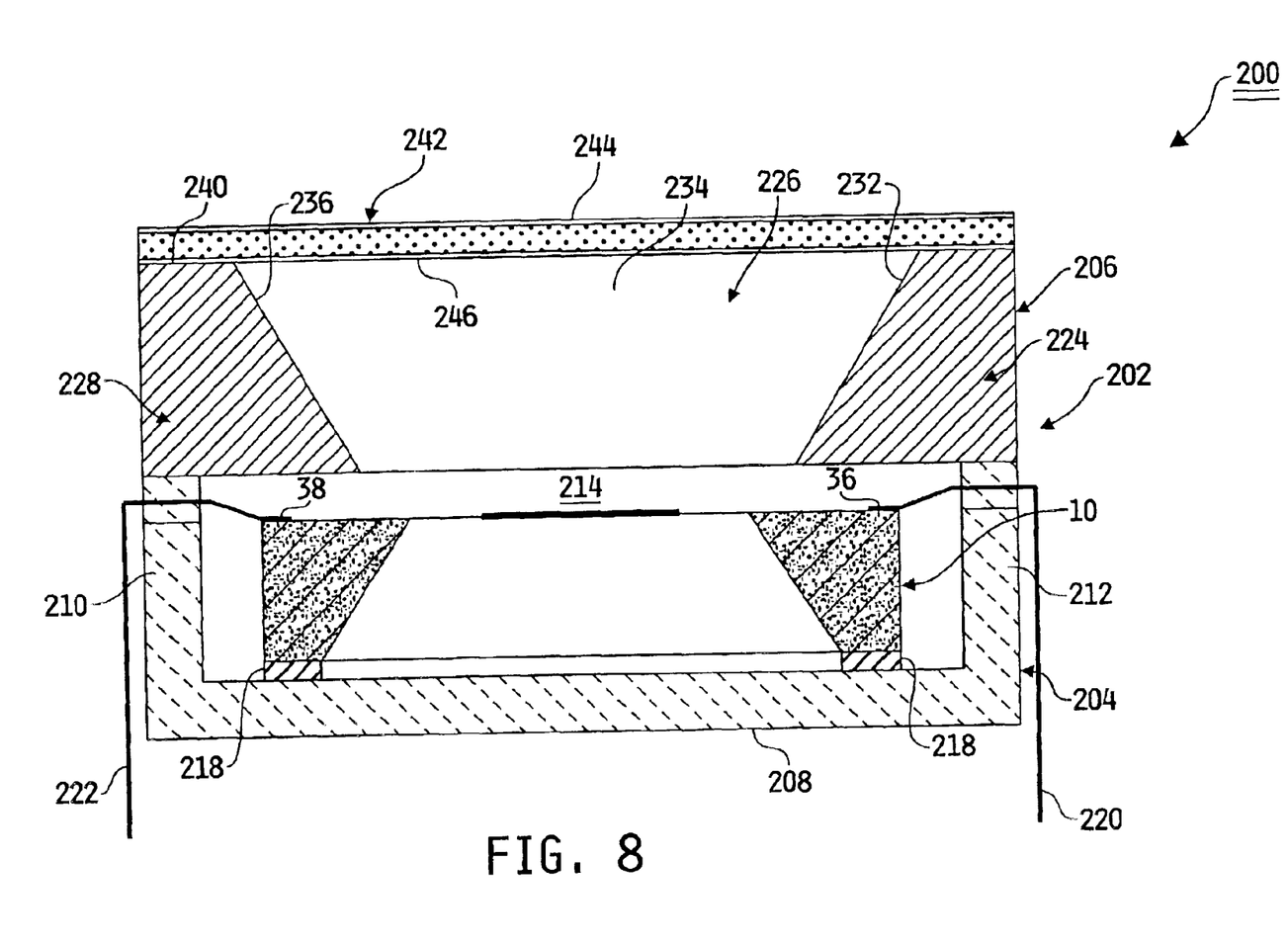
FIG. 8 is a cross-sectional view of another embodiment of an infrared sensor according to the present invention.

FIG. 8 shows another embodiment of an infrared sensor according to the present invention. Sensor 200 includes thermopile 10 which is identical to that described with reference to FIG. 1. Thermopile 10 is enclosed in a package 202 which includes a lower portion 204 and an upper portion 206. Lower portion 204 includes a bottom wall 208, and sidewalls 210, 212, 214, 216 (only three shown). Thermopile 10 is attached to bottom wall 208 with adhesive material 218. Leads 220, 222, are attached to pads 36, 38, respectively, of thermopile 10 and pass through sidewalls 212, 210, respectively, of lower portion 204. Upper portion 202 functions as a light concentrator and includes a first segment 224, a second segment 226, a third segment 228, and a fourth segment 230 (not shown). Upper portion 202 is attached to lower portion 204 using any one of a variety of conventional attachment processes. Segments 224, 226, 228, 230 include reflecting surfaces 232, 234, 236, 238, respectively. If upper portion 202 is fabricated from metal, reflecting surfaces 232, 234, 236, 238 need not be coated to improve their reflectivity. If, however, upper portion 202 is made of ceramic or some other material, reflecting surfaces 232, 234, 236, 238 may be coated with metal as described above.

Segments 224, 226, 228, 230 share an upper surface 240. A silicon window 242 is attached to surface 240 using conventional techniques. Silicon window 242 includes an anti-reflection coating 244 and an interference filter coating 246 which are identical to those described above in conjunction with the description of FIG. 5.

Figure 9:
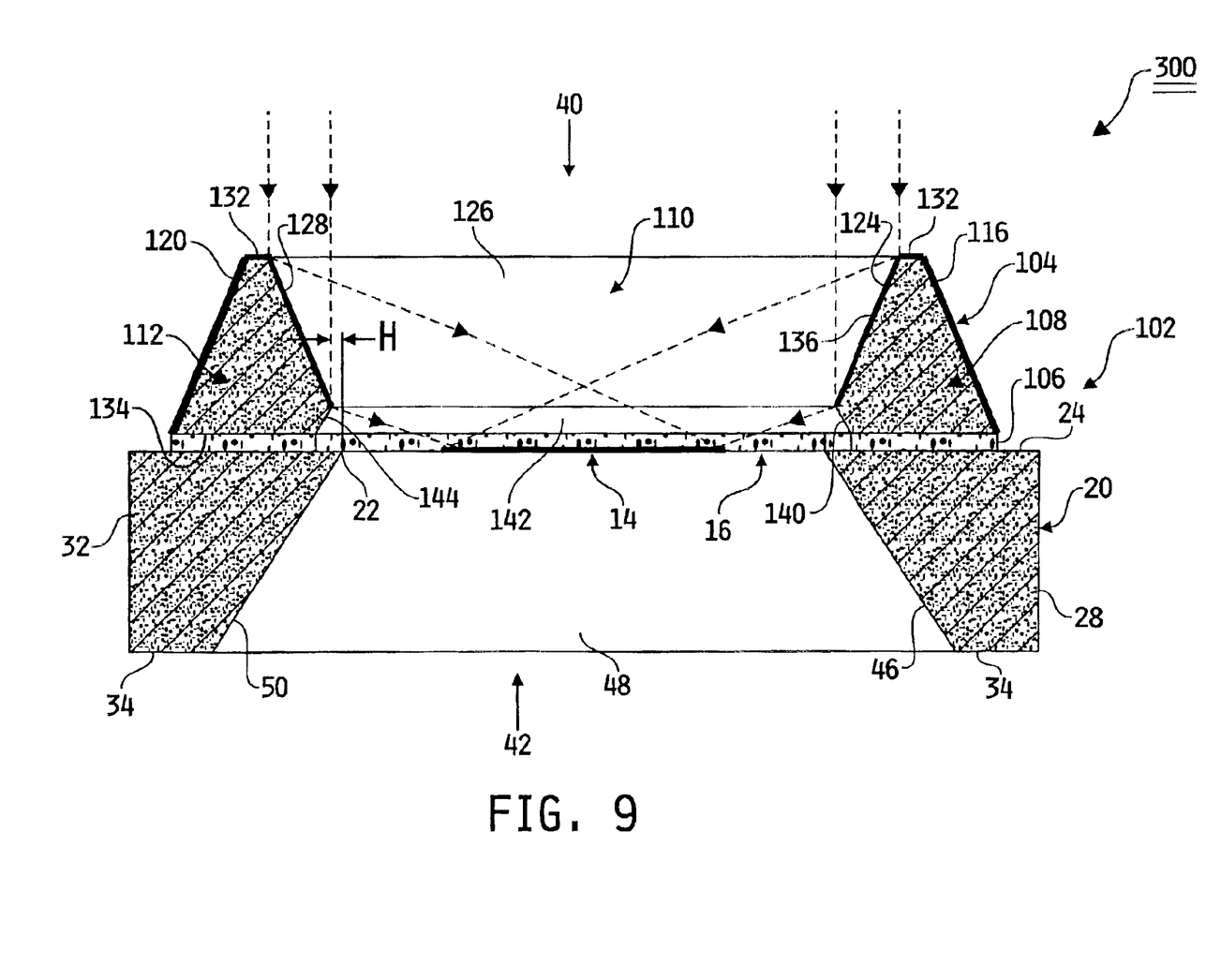
FIG. 9 is a cross-sectional view of another embodiment of an infrared sensor according to the present invention.

Another embodiment of an infrared sensor according to the present invention is shown in FIG. 9. Infrared sensor 300 is substantially similar to infrared sensor 100 of FIG. 7. Accordingly, the reference designations for like components are retained. Infrared sensor 300 is different from infrared sensor 100 in that each of segments 108, 110, 112, 114 include a chamfered edge 140, 142, 144, and 146 between lower surface 134 and reflecting surfaces 124, 126, 128, 130, respectively. Chamfered edges 140, 142, 144, 146 may be formed by masking both sides of a wafer and etching from both sides. As is evident from a comparison of FIGS. 7 and 9, the distance between absorber 14 and light concentrator 104 is increased in infrared sensor 300 of FIG. 9 because of chamfered edges 140, 142, 144, 146. An increase in distance between absorber 14 and the nearest sidewall surface decreases the thermal conduction from absorber 14, through the surrounding air, to light concentrator 104. Consequently, the total output signal from infrared sensor 300 is increased. Additionally, chamfered edges 140, 142, 144, 146 are sufficiently spaced from absorber 14 to render negligible the changes in thermal conductivity between absorber 14 and light concentrator 104 resulting from the positioning of light concentrator 104 during fabrication. More specifically, with undercut inner surfaces such as shown in FIG. 9, light concentrator 104 is less likely to overhang opening 22 during fabrication.

Figure 10:
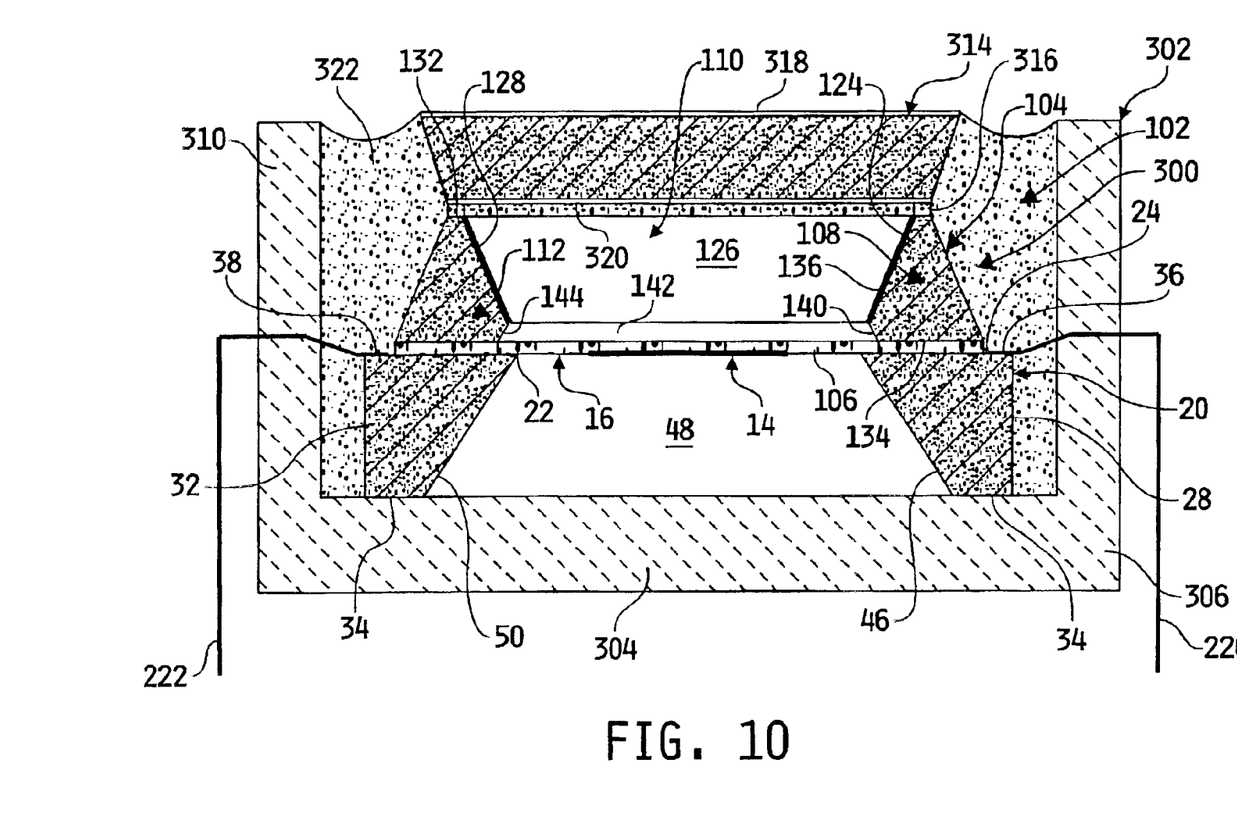
FIG. 10 is a cross-sectional view of another embodiment of an infrared sensor according to the present invention.

FIG. 10 shows an alternative for packaging infrared sensors 100 or 300 of FIGS. 7 and 9, respectively. Housing 302 includes a lower wall 304 and sidewalls 306, 308, 310, 312 (two shown). Body 20 of frame 102 is attached to lower wall 304 at lower surface 34 using any one of a variety of conventional techniques. Leads 220, 222 extend through sidewalls 306, 310, and are attached to pads 36, 38, respectively, to carry the electrical signals to and from infrared sensor 300 as described in conjunction with FIG. 8. Silicon window 314 is attached with adhesive material 316 to upper surface 132 of light concentrator 104. Silicon window 314 includes an anti-reflection coating 318 and an interference filter coating 320 as described above. The remainder of sensor 300 and leads 220, 222 are protected from damage by backfilling housing 302 with epoxy 322 or some similar material.

Although the present invention has been shown and described in detail, the same is to be taken by way of example only and not by way of limitation. Numerous changes can be made to the embodiments described above without departing from the scope of the invention.

What is claimed is:

1. An infrared sensor, including:
   an absorber for absorbing incident infrared power to produce a signal representing the temperature of a target object, the absorber defining a perimeter;
   a frame defining a plurality of reflecting surfaces for reflecting incident infrared power toward the absorber, wherein the reflecting surfaces define a light collecting region, each of the reflecting surfaces being disposed at an obtuse angle relative to the light collecting region; and a membrane contiguously disposed on the frame and spanning the light collecting region, the absorber being disposed in a central region of the membrane, the membrane defining membrane borders extending between the perimeter of the absorber and the plurality of reflecting surfaces, and thermally isolating the absorber from the frame.

2. The infrared sensor of claim 1 further including a plurality of series connected thermocouples, each of the thermocouples extending between the frame and the absorber.

3. The infrared sensor of claim 1 wherein each of the reflecting surfaces is coated with a metal film.

4. The infrared sensor of claim 1 wherein the reflecting surfaces define a cavity having a substantially rectangular cross section.

5. The infrared sensor of claim 1 wherein the frame includes a body for supporting the membrane and the absorber and a light concentrator attached to the body, the reflecting surfaces being disposed on the light concentrator.

6. The infrared sensor of claim 5 wherein the light concentrator is micromachined silicon, including first and second parallel segments, a third segment connected between one end of the first segment and one end of the second segment at a right angle to the first and second segments, and a fourth segment connected between the other ends of the first and second segments at a right angle to the first and second segments and parallel to the third segment.

7. The infrared sensor of claim 6 wherein each of the segments includes an inward side and an outward side, the reflecting surfaces being disposed on the inward sides of the segments.

8. The infrared sensor of claim 5 wherein the light concentrator encloses the body and includes a bottom wall to which the body is mounted, four side walls surrounding the body, each of the side walls including one of the reflecting surfaces, and a silicon window extending between the side walls, parallel to the bottom wall.

9. The infrared sensor of claim 1 further including a circuit board having a void, the frame being mounted to the circuit board such that the absorber is disposed adjacent the void.

10. The infrared sensor of claim 9 further including a silicon window attached to the frame and extending between the reflecting surfaces, the silicon window enclosing the absorber.

11. The infrared sensor of claim 10 wherein the silicon window includes an outside surface having an antireflection coating and an inside surface adjacent the absorber having an interference filter.

12. The infrared sensor of claim 1 wherein the frame defines a rectangular opening having a perimeter, the frame including four segments disposed about the perimeter, each of the segments having an inner side defining one of the reflecting surfaces.

13. The infrared sensor of claim 12 wherein each segment has a substantially triangular cross section, and the inner side of each reflecting surface extends from adjacent the perimeter of the opening to an apex of the triangular cross section.

14. The infrared sensor of claim 12 wherein each of the segments includes a top surface which is substantially parallel to the absorber, the sensor further including a silicon window mounted to the top surfaces of the segments.

15. The infrared sensor of claim 12 wherein each segment inner side includes a chamfered edge disposed adjacent the perimeter of the opening, the corresponding reflecting surface ending at the chamfered edge.

16. An infrared sensor, including:

an absorber for absorbing incident infrared power to produce a signal representing the temperature of a target object;

a frame supporting the absorber, the frame including a plurality of reflecting surfaces disposed about the circumference of the absorber for reflecting incident infrared power toward the absorber, wherein the reflecting surfaces define a light collecting region, each of the reflecting surfaces being disposed at an obtuse angle relative to the light collecting region; and a membrane for thermally isolating the absorber from the frame including the plurality of reflecting surfaces, the membrane being supported by the frame and lying in the light collecting region, the absorber being disposed in a central region of the membrane, wherein the frame defines a rectangular opening having a perimeter, the frame including four segments disposed about the perimeter, each of the segments having an inner side defining one of the reflecting surfaces, wherein each segment inner side includes a chamfered edge disposed adjacent the perimeter of the opening, the corresponding reflecting surface ending at the chamfered edge.

17. An infrared sensor, including:

a frame defining an opening;

a membrane spanning the opening, and contiguously disposed on the frame;

an absorber disposed in a central region of the membrane for absorbing incident infrared power and heating in response thereto, the absorber defining a perimeter;

the frame including four side walls defining a cavity adjacent one side of the membrane, each of the side walls having a reflecting surface disposed at an angle relative to the absorber for reflecting incident light toward the absorber, the membrane defining membrane borders extending between the perimeter of the absorber and the reflecting surfaces.

18. The infrared sensor of claim 17 further including a plurality of series connected thermocouples, each of the thermocouples extending between the frame and the absorber.

19. The infrared sensor of claim 17 wherein each of the reflecting surfaces is coated with a metal film.

20. The infrared sensor of claim 17 wherein the frame includes a body for supporting the membrane and the absorber and a light concentrator attached to the body, the reflecting surfaces being disposed on the light concentrator.

21. The infrared sensor of claim 20 wherein the light concentrator is micromachined silicon, including first and second parallel segments, a third segment connected between one end of the first segment and one end of the second segment at a right angle to the first and second segments, and a fourth segment connected between the other ends of the first and second segments at a right angle to the first and second segments and parallel to the third segment.

22. The infrared sensor of claim 20 wherein the light concentrator encloses the body and includes a bottom wall to which the body is mounted, four side walls surrounding the body, each of the side walls including one of the reflecting surfaces, and a silicon window extending between the side walls, parallel to the bottom wall.

23. The infrared sensor of claim 17 further including a circuit board having a void, the frame being mounted to the circuit board such that the absorber is disposed adjacent the void.

24. The infrared sensor of claim 17 further including a silicon window attached to the frame to enclose the absorber, the window extending between the reflecting surfaces.

25. The infrared sensor of claim 24 wherein the window includes an outside surface having an antireflection coating and an inside surface adjacent the absorber having an interference filter.

26. The infrared sensor of claim 17 wherein each reflecting surface has one edge adjacent the perimeter of the opening and an opposite edge offset outwardly from the perimeter of the opening.

27. The infrared sensor of claim 17 wherein the frame defines a rectangular opening having a perimeter, the frame including four segments disposed about the perimeter, each of the segments having an inner side defining one of the reflecting surfaces.

28. The infrared sensor of claim 27 wherein each segment has a substantially triangular cross section, the inner side of each reflecting surface extending from adjacent the perimeter of the opening to an apex of the triangular cross section.

29. The infrared sensor of claim 27 wherein each of the segments includes a top surface which is substantially parallel to the absorber, the sensor further including a silicon window mounted to the top surfaces of the segments.

30. The infrared sensor of claim 27 wherein each inner side includes a chamfered edge disposed adjacent the perimeter of the opening, the corresponding reflecting surface ending at the chamfered edge.

31. An infrared sensor, including:
a frame defining an opening;
a membrane spanning the opening;
an absorber disposed in a central region of the membrane for absorbing incident infrared power and heating in response thereto;
the frame including four side walls defining a cavity adjacent one side of the membrane, each of the side walls having a reflecting surface disposed at an angle relative to the absorber for reflecting incident light toward the absorber,
wherein the frame defines a rectangular opening having a perimeter, the frame including four segments disposed about the perimeter, each of the segments having an inner side defining one of the reflecting surfaces, wherein each inner side includes a chamfered edge disposed adjacent the perimeter of the opening, the corresponding reflecting surface ending at the chamfered edge.

32. An infrared sensor, including:
an absorber for absorbing incident infrared power and heating in response thereto, the absorber defining a perimeter;
a frame including four segments defining an opening;
a plurality of thermocouples connected in series and extending between the absorber and the frame, each of the thermocouples having a Seebeck voltage which depends upon the temperature difference between the frame and the absorber;
wherein each of the four segments includes a reflecting surface disposed at an angle relative to the absorber for reflecting incident infrared power toward the absorber, the reflecting surfaces collectively defining the sides of a light concentrating cavity; and
a membrane for thermally isolating the frame from the absorber, the membrane being supported by the frame and spanning the opening, the absorber being disposed in a central region of the membrane, the membrane defining membrane borders extending between the perimeter of the absorber and the reflecting surfaces for thermally isolating the absorber from the frame, the membrane contiguously disposed on the frame.

33. The infrared sensor of claim 32 wherein the reflecting surfaces are disposed at an obtuse angle relative to the absorber.

34. The infrared sensor of claim 32 wherein each of the reflecting surfaces is coated with a metal film.

35. The infrared sensor of claim 32 wherein the frame includes a body for supporting the absorber and a light concentrator attached to the body, the reflecting surfaces being disposed on the light concentrator.

36. The infrared sensor of claim 35 wherein the light concentrator is micromachined silicon, including first and second parallel segments, a third segment connected between one end of the first segment and one end of the second segment at a right angle to the first and second segments, and a fourth segment connected between the other ends of the first and second segments at a right angle to the first and second segments and parallel to the third segment.

37. The infrared sensor of claim 36 wherein each of the segments includes an inward side and an outward side, the reflecting surfaces being disposed on the inward sides of the segments.

38. The infrared sensor of claim 35 wherein the light concentrator encloses the body and includes a bottom wall to which the body is mounted, four side walls surrounding the body, each of the side walls including one of the reflecting surfaces, and a silicon window extending between the side walls, parallel to the bottom wall.

39. The infrared sensor of claim 32 further including a circuit board having a void, the frame being mounted to the circuit board such that the absorber is disposed adjacent the void.

40. The infrared sensor of claim 32 further including a silicon window attached to the frame and extending between the reflecting surfaces, the silicon window enclosing the absorber.

41. The infrared sensor of claim 40 wherein the silicon window includes an outside surface having an antireflection coating and an inside surface adjacent the absorber having an interference filter.

42. The infrared sensor of claim 32 wherein the frame includes four segments disposed about a perimeter of the opening, each of the segments having an inner side defining one of the reflecting surfaces.

43. The infrared sensor of claim 42 wherein each of the segments has a substantially rectangular cross section, the inner side of each reflecting surface extending from adjacent the perimeter of the opening to an apex of the triangular cross section.

44. The infrared sensor of claim 42 wherein each of the segments includes a top surface which is substantially parallel to the absorber, the sensor further including a silicon window mounted to the top surfaces of the segments.

45. The infrared sensor of claim 42 wherein each segment inner side includes a chamfered edge disposed adjacent the perimeter of the opening, the corresponding reflecting surface ending at the chamfered edge.

46. An infrared sensor, including:
an absorber for absorbing incident infrared power and heating in response thereto;

a frame including four segments defining an opening, the absorber being disposed within the opening;

a plurality of thermocouples connected in series and extending between the absorber and the frame, each of the thermocouples having a Seebeck voltage which depends upon the temperature difference between the frame and the absorber;

wherein each of the four segments includes a reflecting surface disposed at an angle relative to the absorber for reflecting incident infrared power toward the absorber, the reflecting surfaces collectively defining the sides of a light concentrating cavity; and a membrane for thermally isolating the frame from the absorber, the membrane being supported by the frame and spanning the opening, the absorber being disposed in a central region of the membrane, wherein the frame includes four segments disposed about a perimeter of the opening, each of the segments having an inner side defining one of the reflecting surfaces wherein each segment inner side includes a chamfered edge disposed adjacent the perimeter of the opening, the corresponding reflecting surface ending at the chamfered edge.

* * * * *